United States Patent
Somoza et al.

(10) Patent No.: US 9,574,661 B2
(45) Date of Patent: Feb. 21, 2017

(54) CONTROLLED APPLIED RESISTANCE MULTIPLE AXIS CONTINUALLY VARIABLE DIFFERENTIAL TRANSMISSION

(71) Applicants: Karin M. Somoza, Mission Viejo, CA (US); Edmond A. Defrank, Porter Ranch, CA (US); Robert B. Silverman, Pasadena, CA (US); Allen Mark Jones, Imperial Beach, CA (US)

(72) Inventors: Karin M. Somoza, Mission Viejo, CA (US); Edmond A. Defrank, Porter Ranch, CA (US); Robert B. Silverman, Pasadena, CA (US); Allen Mark Jones, Imperial Beach, CA (US)

( * ) Notice: Subject to any disclaimer, the term of this patent is extended or adjusted under 35 U.S.C. 154(b) by 87 days.

(21) Appl. No.: 14/202,208

(22) Filed: Mar. 10, 2014

(65) Prior Publication Data

US 2014/0288792 A1 Sep. 25, 2014

Related U.S. Application Data

(60) Provisional application No. 61/778,189, filed on Mar. 12, 2013.

(51) Int. Cl.
*G06F 17/00* (2006.01)
*F16H 61/66* (2006.01)
*F16H 3/72* (2006.01)

(52) U.S. Cl.
CPC ............... *F16H 61/66* (2013.01); *F16H 3/72* (2013.01)

(58) Field of Classification Search
CPC .................... F16H 61/66; F16H 3/72
USPC ......................................... 701/58
See application file for complete search history.

(56) References Cited

U.S. PATENT DOCUMENTS

| | | | | |
|---|---|---|---|---|
| 6,414,453 | B1* | 7/2002 | Tamagawa | B60K 6/28 180/165 |
| 2011/0046860 | A1* | 2/2011 | Pinkos | B60K 17/16 701/58 |
| 2012/0234124 | A1* | 9/2012 | Nozaki | F16H 61/32 74/473.12 |
| 2013/0184934 | A1* | 7/2013 | Takeuchi | B60W 30/025 701/37 |
| 2014/0121918 | A1* | 5/2014 | Davis | B60W 10/103 701/55 |
| 2015/0240920 | A1* | 8/2015 | Tang | F16H 15/48 475/115 |

* cited by examiner

*Primary Examiner* — David J Hlavka
(74) *Attorney, Agent, or Firm* — Edmond DeFrank

(57) ABSTRACT

The embodiments disclose a method and apparatus for controlling the output ratio of the speed of operation and distribution of power/energy from a primary power source, applying continuously variable resistance using a multiple axis continually variable differential transmission to a primary power source input to adjust the rotational power level and speed output to match an operator adjustable performance speed setting at the same, slower decelerated or faster accelerated speed or power level in the same or reverse direction; and controlling the operation of the multiple axis continually variable differential transmission to match the operator desired performance speed using a programmable control system to process operator input, load stored operating parameters, and modify operating parameters based on operator input and adjusting continuously variable resistance operations.

6 Claims, 12 Drawing Sheets

CONTROLLED APPLIED RESISTANCE MULTIPLE AXIS CONTINUALLY VARIABLE DIFFERENTIAL TRANSMISSION

CROSS-REFERENCE TO RELATED APPLICATIONS

This application is based on U.S. Provisional Patent Application Ser. No. 61/778,189 filed Mar. 12, 2013, entitled "Controlled Applied Resistance Multiple Axis Continually Variable Differential Transmission", by First Named Inventor Karin M. Somoza, et al.

BACKGROUND OF THE INVENTION

Current continuously variable transmission (CVT) technologies use friction-drive to control the transfer of power. Friction-drive systems can not handle high torque efficiently due to slippage. Friction-drive systems use a belt and pulley or a disk and rubber wheel to transmit torque through the drive train. The belts or wheels slip. Friction is added to reduce slippage which in turn adds drag and cuts down on efficiency. Car designers use multi-speed transmission, some up to 8 speeds, to try to best match the engines efficiency range with the typical driving speeds. All engines, gas, diesel, electric etc. operate most efficiently at a particular rpm range. Current CVT systems are not used in higher torque applications because the efficiency of having an engine run at its most efficient rpm range is negated by the inefficiency of torque transfer.

In theory a transmission moves in a continuous motion. To date the actual operation of transmissions has been less than continuous motion. In manual transmissions shifting gears requires passing through a neutral position and perhaps disengaging a clutch which causes the motor to rotate with less load or even without load. This interrupts and reduces the amount of work being accomplished and wastes power or energy. Automatic transmissions are more efficient because the delays caused by human abilities to shift were inconsistent, but with automatic transmissions the shifting still occurs. Current continuously variable transmission or CVT systems, although an improvement over automatic transmissions, accomplish the variable transitions by transferring power using friction from two variable diameter objects thereby varying the ratio with power losses due to slippage.

SUMMARY OF THE INVENTION

The present invention is embodied in a continually variable transmission power transfer system and method that separates energy from motion and transmits energy through a gear to gear low friction, efficient variable speed transmission. The continually variable transmission power transfer system includes a programmable multiple performance mode selection subsystem, a programmable computer based engine operating adjustment control subsystem and a light weight resistance continually variable transmission.

DETAILED DESCRIPTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of automotive transmission and operation are described for illustrative purposes and the underlying technology can apply to any variable power transfer operations. In one embodiment of the present invention, the transfer of rotational power from the engine of a vehicle adjust the speed of the vehicle is performed through the controlled application of differential resistance. The adjustable transfer of rotational power from one or more motor, engine or power source can be performed through the controlled application of differential resistance of the present invention in a number of other operations.

Figure 1:
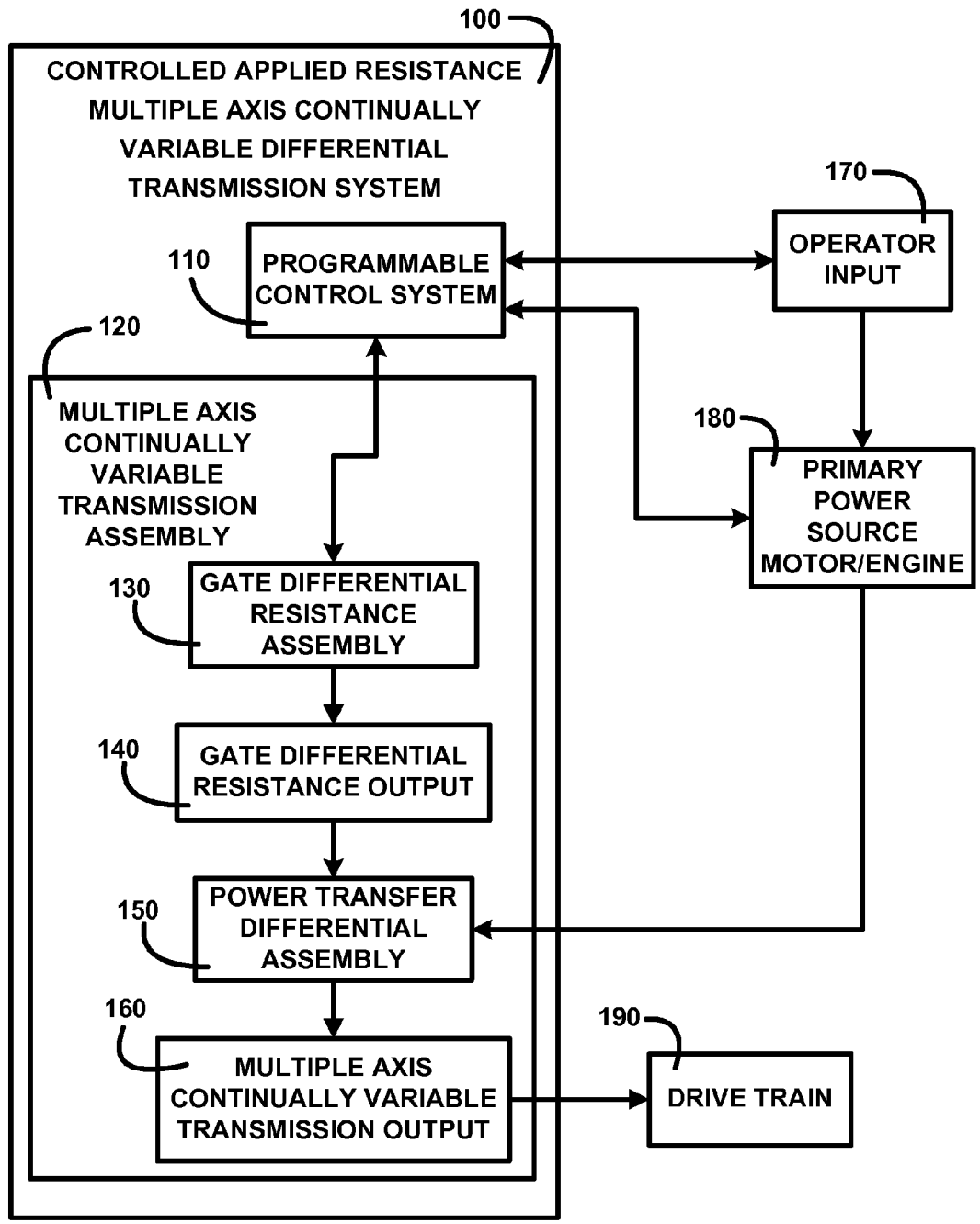
FIG. 1 shows a block diagram of an overview of a controlled applied resistance multiple axis continually variable transmission system of one embodiment.

FIG. 1 shows a block diagram of an overview of the controlled applied resistance multiple axis continually variable transmission system of one embodiment. The controlled applied resistance multiple axis continually variable differential transmission system 100 includes a multiple axis continually variable transmission assembly 120 configured to rotate one axis X, Y, or Z and splits the motion to one or the other axis. A differential in a vehicle gets input power from the driveshaft then transfers power out to one, the other, or a combination of both of the drive wheels. The controlled applied resistance multiple axis continually variable transmission system 100 controls the ratio of speed or energy between two power outputs coming from one input. The multiple axis continually variable transmission assembly 120 transmits energy with gear to gear transfers and does not require friction to create the variance of speeds desired. The multiple axis continually variable transmission assembly 120 is scalable and is configured to handle larger amounts of torque using for example larger gear sets to handle more torque without increasing friction which can rob energy. The multiple axis continually variable transmission assembly 120 has less unsprung weight and uses fewer parts to transmit the energy. The controlled applied resistance multiple axis continually variable transmission system 100 can reduce the amount of energy a conventional drive train uses for example from 15-20% to 10% or less. The controlled applied resistance multiple axis continually variable transmission system 100 creates significant increase in fuel economy, a significant increase in performance, a significant decrease in cost and a reduction in weight of one embodiment.

The controlled applied resistance multiple axis continually variable transmission system 100 adjusts the engine to operate at its most efficient rpm range creating an increase in fuel economy and performance. Reduced unsprung weight, less energy used in the multiple axis continually variable transmission assembly 120 and overall weight reduction of the vehicle being propelled create additional increases in fuel economy and performance. The cost and weight savings will come from the simpler design and smaller number of components. Some of the weight reduction is achieved because the multiple axis continually variable transmission assembly 120 operates from 0% to 100% thereby eliminating a torque converter or clutch system of one embodiment.

Another major benefit is that the controlled applied resistance multiple axis continually variable transmission system 100 includes the use of multiple engines or power sources. Current vehicle designs using multiple power sources such as hybrids with gas and electric motors can use an efficient way of combining the power from the different sources. The controlled applied resistance multiple axis continually variable transmission system 100 by transmitting power and not just speed can be configured to include the addition of 2 or more sources easily and more economically of one embodiment.

FIG. 1 shows an overview of the controlled applied resistance multiple axis continually variable transmission system 100 in an operational arrangement. The motor energy or power in the form of rotational power from a primary power source motor/engine 180 is conveyed to the multiple axis continually variable transmission assembly 120 which splits the speed and energy or power. A programmable control system 110 receives the desired speed or power level from operator input 170 then calculates the power level difference between actual motor speed and desired vehicle speed. The calculated result in the form of a ratio is transmitted to a gate differential resistance assembly 130 which uses the varying ratio to proportionately control the rotational speed of a gate differential resistance output 140. The gate differential resistance output 140 adjusts the operation of a power transfer differential assembly 150 and thereby a multiple axis continually variable transmission output 160. The gate or diverter consumes little energy. The multiple axis continually variable transmission assembly 120 transfers sufficient power through the gate differential resistance output 140 shaft to the multiple axis continually variable transmission output 160 to a drive train 190 regardless of rpm to reach the desired speed power level. The difference between the speed and the power coming into the power transfer differential assembly 150 and what is determined to produce the desired speed is adjusted by the controlled operation gate differential resistance assembly 130 through the interaction of the gate differential resistance output 140 and the power transfer differential assembly 150 of one embodiment.

The operation of the controlled applied resistance multiple axis continually variable transmission system 100 causes the engine to rev up to its optimum rpm, smoothly and constantly accelerating an auto, delivering its peak horsepower and not having to shift gears and run up again. The controlled applied resistance multiple axis continually variable transmission system 100 adjusts the engine to idle or reduce power to reduce fuel consumption while maintaining cruising speed. The operation of the programmable control system 110 controls the acceleration of the multiple axes continually variable transmission assembly 120 instantly reducing the time used to reach the desired speed using the drive train 190 while controlling the engine to optimally change operating performance levels to deliver the desired power of one embodiment.

Figure 2:
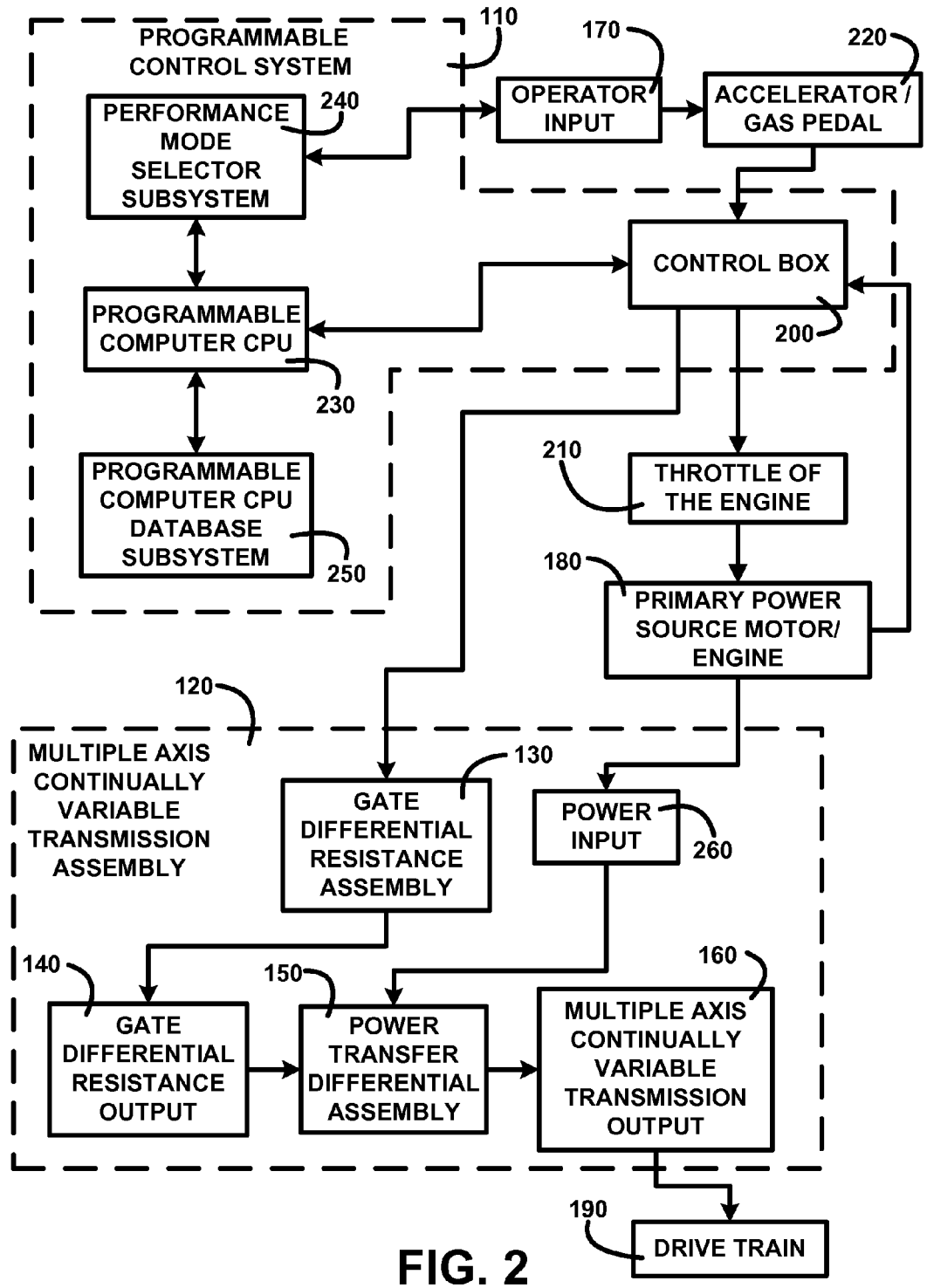
FIG. 2 shows a flow chart overview of a controlled applied resistance multiple axis continually variable transmission system of one embodiment.

Detailed Operation:

FIG. 2 shows a flow chart overview of the controlled applied resistance multiple axis continually variable transmission system of one embodiment. FIG. 2 illustrates a flow chart of the controlled applied resistance multiple axis continually variable transmission system 100 of FIG. 1 installation operating sequences. The operator input 170 is made in two parts. One part is the operator by use of an accelerator/gas pedal 220 indicating the desired speed which is transmitted to a control box 200. The other part of the operator input 170 is the selection of the performance mode using a performance mode selector subsystem 240 of the programmable control system 110. The programmable control system 110 controls the amount of resistance utilized to match that desired speed. The performance mode selected is sent to a programmable computer CPU 230. The desired speed is transmitted to the control box 200 which is constantly receiving the current operating actual speed from the primary power source motor/engine 180 of one embodiment.

The control box 200 transmits both the desired speed and current operating speed to the programmable computer CPU 230 which computes the increase or decrease of current operating actual speed compared to desired speed. The programmable computer CPU 230 using the selected performance mode input and the input of the computed increase or decrease of current actual speed compared to desired speed extracts the appropriate desired speed power level data from a programmable computer CPU database subsystem 250. The programmable computer CPU 230 then calculates the rpm for the horsepower to move the vehicle to the desired speed and expresses this as a computed ratio level of adjustment. The programmable computer CPU 230 using the correct data base information for the performance mode selected by the operator in the performance mode selector subsystem 240 computes the ratio level of adjustment required to reach and maintain the desired speed of one embodiment.

The programmable computer CPU 230 can also increase or decrease power from the primary power source motor/engine 180 if the load changes but the desired speed remains constant, for example going up a hill. In this example the instruction is transmitted to the control box 200 which activates a throttle of the engine 210 to make the increase in power. In this instance the computed ratio level of adjustment required may stay the same but the setting of the throttle of the engine 210 may change. If the power determined comes at a higher rpm the programmable computer CPU 230 will change the ratio of the multiple axis continually variable transmission assembly 120 as well of one embodiment.

The control box 200 transmits the computed ratio level of adjustment required to the multiple axis continually variable transmission assembly 120 at the same time. The computed ratio level of adjustment sets the ratio for the gate differential resistance assembly 130 or diverter control for the distribution of a power input 260 through the power transfer differential assembly 150. The computed ratio level of adjustment in the gate differential resistance assembly 130 increases or decreases the rpm of the gate differential resistance output 140. The effect of the rpm of the gate differential resistance output 140 on the power transfer differential assembly 150 can change the rpm of the multiple axes continually variable transmission output 160 created by the power input 260. If the gate differential resistance output 140 is not rotating all the rotational power of the power input 260 transfers to the multiple axis continually variable transmission output 160 and thusly to the drive train. If the rpm of the gate differential resistance output 140 increases then the rpm of the multiple axis continually variable transmission output 160 decreases slowing the speed of the vehicle. Conversely if the rpm of the gate differential resistance output 140 decreases then the rpm of the multiple axis continually variable transmission output 160 increases increasing the speed of the vehicle. The change to the desired speed occurs while the primary power source motor/engine 180 is changing the amount of required horsepower or power output to maintain the desired speed of one embodiment.

The programmable control system 110 is continually adjusting the ratio applied by the gate differential resistance assembly 130 as the vehicle speed is increasing or decreasing in speed. As the vehicle reaches the desired speed the programmable control system 110 reduces the throttle of the engine 210 to produce just enough power to maintain the desired speed. When the desired speed changes, the process repeats of one embodiment.

A minor change can be made in the accelerator/gas pedal 220. Current "gas pedals" connect to the engine. The "gas pedals" can be reconfigured to become "speed regulator pedals" that will connect to the control box 200 directly. Acting like a rheostat, the farther you depress the pedal, the higher the desired speed. The greater the difference in the current speed versus the desired speed the greater the amount of hp to propel the vehicle at its new speed. The programmable control system 110 will control how much hp the engine produces and adjust the throttle of the engine 210 and control the adjustment of energy (hp) the multiple axis continually variable transmission assembly 120 transfers to the multiple axis continually variable transmission output 160 of one embodiment.

Although there will be a slight mechanical difference in how the speeds of acceleration is transmitted from the operator to the engine and transmission, the drivability will not change. It actually becomes smoother because there will no longer be changing of gears. It should feel and respond like driving a single speed vehicle except for the increase in performance and efficiency of one embodiment.

If the force applied to the reconfigured "speed regulator" pedal is lessened than the desired speed will be lowered and the programmable control system 110 will apply engine breaking, reduce the setting on the throttle of the engine 210 and through adjustments in the gate differential resistance assembly 130 ratio reduce the power transferred to multiple axis continually variable transmission output 160 thus slowing the vehicle of one embodiment.

Figure 3:
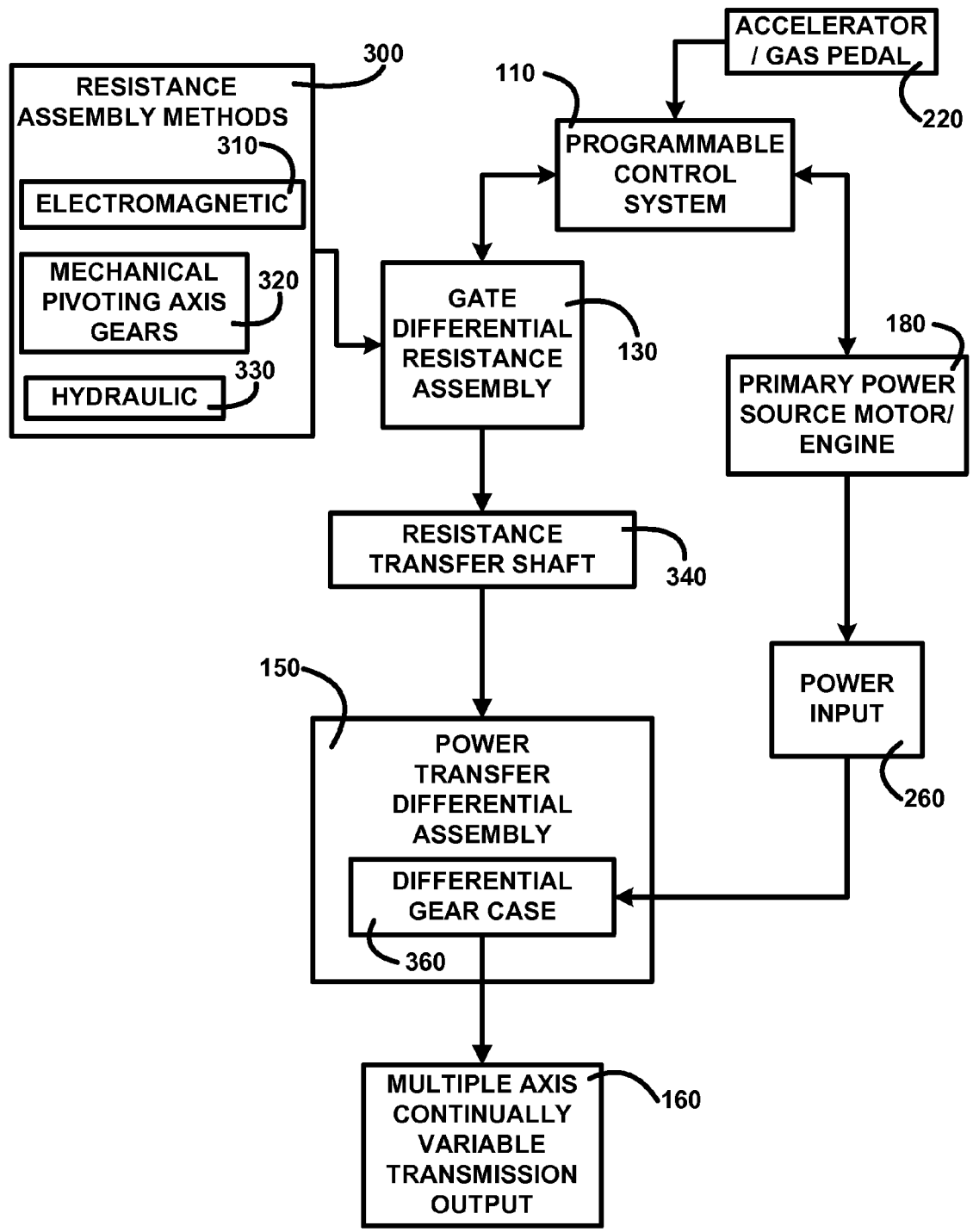
FIG. 3 shows a flow chart of a multiple axis continually variable transmission system of one embodiment.

Resistance Assembly Methods:

FIG. 3 shows a flow chart of the multiple axis continually variable transmission system of one embodiment. Shown in FIG. 3 is the accelerator/gas pedal 220 which inputs the desired power level or speed from the operator to the programmable control system 110. The programmable control system 110 transmits the desired power level or speed to the primary power source motor/engine 180 in the form of rpm. The primary power source motor/engine 180 transfers the rotational power to the power input 260. The power input 260 transfer of the rotational power is made to the power transfer differential assembly 150 by rotating a differential gear case 360. The rotation imparted on the case causes the differential to rotate at the same speed if the power input speed matches the desired speed. This rotational speed is imparted to multiple axis continually variable transmission output 160.

The gate differential resistance assembly 130 can be configured to use any of three multiple axis continually variable transmission resistance assembly methods 300 which include electromagnetic 310, mechanical pivoting axis gears 320 and hydraulic 330 resistance systems. When the programmable control system 110 determines a difference between the desired power level and the power being transferred by the primary power source it initiates operation of the gate differential resistance assembly 130 to adjust the rotational power level of multiple axis continually variable transmission output 160 to match the desired speed. Using any of the three multiple axes continually variable transmission resistance assembly methods 300 a resistance transfer shaft 340 rotates either faster or slower than the differential gear case 360. When the resistance transfer shaft 340 rotates faster it causes multiple axis continually variable transmission output 160 to rotate slower until the primary power source motor/engine 180 reduces power according to the level transmitted by the programmable control system 110 to match the desired speed. When the resistance transfer shaft 340 rotates slower it causes multiple axis continually variable transmission output 160 to rotate faster until the primary power source motor/engine 180 increases power according to the level transmitted by the programmable control system 110 to match the desired speed. The continuously operating action of the gate differential resistance assembly 130 to either reduce or increase multiple axis continually variable transmission output 160 causes the desired speed to be maintained on a more consistent basis while the primary power source motor/engine 180 reacts to the adjustments of the programmable control system 110. The continuous adjustments of the programmable control system 110 provides efficient operation of the primary power source motor/engine 180 to produce the power to reach the desired speed thus saving fuel and over a longer term maintenance costs.

Each of the three multiple axis continually variable transmission resistance assembly methods 300 reduces power losses due to a lack of slippage. The electromagnetic 310 resistance assembly method uses a power source for example a car battery to cause electromagnetic rotation to adjust the speed of multiple axis continually variable transmission output 160. The mechanical pivoting axis gears 320 resistance assembly method uses for example the power input of the primary power source motor/engine 180 and through a device which pivots independently or in a coordinated manner two different axial adjusters which increase or decrease the rotation of the resistance transfer shaft 340 to adjust the speed of multiple axis continually variable transmission output 160. The hydraulic 330 resistance assembly method uses a power source for example a car battery to create hydraulic pressure to cause rotation to adjust the speed of multiple axis continually variable transmission output 160 of one embodiment.

Figure 4:
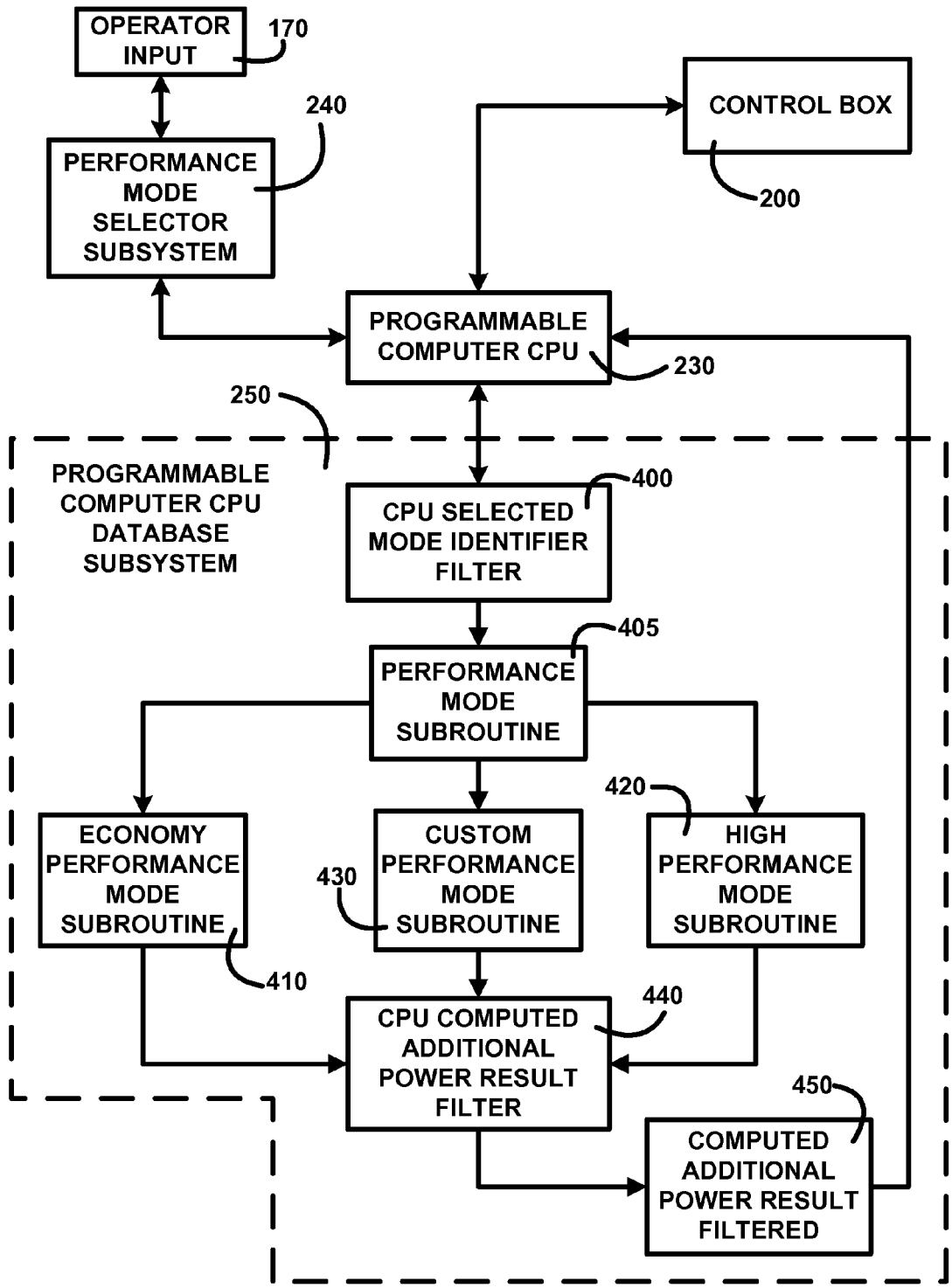
FIG. 4 shows a flow chart overview a multiple axis continually variable transmission system programmable control system of one embodiment.

Programmable Control System:

FIG. 4 shows a flow chart overview the multiple axis continually variable transmission system programmable control system of one embodiment. The programmable control system 110 of FIG. 1 contains various systems and subsystems. The speed and multiple axis continually variable transmission assembly 120 of FIG. 1 computed ratio level are controlled by the programmable computer CPU 230. The programmable computer CPU 230 takes input from the operator as to desired speed and mode of operation or level of responsiveness. The programmable computer CPU 230 then initiates an adjustment to the engine or power source to deliver the desired power and adjusts the gate differential resistance assembly 150 of FIG. 1 to deliver the power at the desired speed by adjusting the ratio between input speed from the power source and the desired output speed of one embodiment.

The mode of operation or level of responsiveness is selected with the performance mode selector subsystem 240. The mode of operation selected is transmitted to the programmable computer CPU 230 which accesses the mode subroutine parameters with the programmable computer CPU database subsystem 250. The programmable computer CPU database subsystem 250 uses a CPU selected mode identifier filter 400 to load the parameters from one of multiple subroutines. The subroutines can be for example an economy mode subroutine 410, a high performance mode subroutine 420 and a custom mode subroutine 430. Each of these subroutines contains the parameters for the level of responsiveness for the respective mode of operation. The parameters adjust and set the different program mapping used by the programmable computer CPU 230. To operate for example in an economy mode the CPU can be set to utilize mapping that increases power 5% over the ultimate threshold which slowly increases the vehicle to the desired speed. In high performance mode for example the mapping can for example be set to provide 100% of the available power to increase the vehicle to the desired speed. The desired speed is the one the operator sets with the accelerator/gas pedal 220 of FIG. 2. The greater the difference between the actual speed and the desired speed, actual or percentage, can dictate to the CPU to use variable mapping. There could be various maps between maximum economy and maximum performance. The driver can select a mode particular to the driver's current desire.

The variety of performance modes can be configured to include a manual mode. The multiple axis continually variable transmission assembly 120 of FIG. 1 can also be used without the programmable control system 110 of FIG. 1 by having the operator control the power from the throttle of the engine 210 of FIG. 2 and the desired gear ratio. Instead of a gear selector that has a specific number of gears, the multiple axis continually variable transmission assembly 120 of FIG. 1 can be configured to include for example a ratio selector configured for a 0% to 100% range of variable ratios. The operator can gradually or quickly increase or decrease the ratio between the source and the output instead of selecting one of a few preset ratios. Several preprogrammed ratio stops can be selected with paddle shifters or stick shifter and the programmed stops can be different for modes such as manual performance or manual economy. This would give a driving experience more similar to current style transmissions. The programmable control system 110 of FIG. 1 can include under an automatic mode the programmable control system 110 of FIG. 1 control or a manual mode selection. The programmable control system 110 of FIG. 1 could have an override feature in which the automatic mode can take over if engine harm or drive train harm is anticipated. Specific mapping programs can be created for different vehicles and applications of one embodiment.

The performance mode selector subsystem 240 is programmable. The number of performance modes can be varied and each individual performance mode is assigned a digital identifier code. Once a performance mode has been selected the assigned identifier code is logged into the programmable computer CPU 230 and a different performance mode is selected. When the performance mode identifier code input is received by the programmable computer CPU 230 it is checked against the CPU selected mode identifier filter 400 to confirm that a valid performance mode database subroutine exists. If no valid performance mode database subroutine exists the programmable computer CPU 230 will indicate an invalid performance mode selection has been made and a new performance mode should be chosen. The CPU selected mode identifier filter 400 additionally provides the input and output routing for database queries and reprogramming of performance mode subroutine database information of one embodiment.

The driver sets the desired performance mode using the performance mode selector subsystem 240. The performance mode selected is sent to the programmable computer CPU 230. The control box 200 transmits the current actual speed and desired speed to the programmable computer CPU 230. With a valid performance mode selection assigned identifier code logged into the programmable computer CPU 230 the input received from the control box 200 is temporarily recorded of one embodiment.

The programmable computer CPU 230 then queries the appropriate performance mode subroutine database. Illustrated in FIG. 4 are the economy mode subroutine 410, the custom mode subroutine 430 and the high performance mode subroutine 420. Each of the performance mode subroutine databases contain different engine speed mapping information that has been programmed to maximize fuel efficiency or provide high performance levels or somewhere in between of one embodiment.

The information programmed into each performance mode subroutine database will include a subroutine digital identifier code used in the performance mode selection process and will include three sets of performance data. The first data set will be of the power and rpm performance data for the primary power source motor/engine 180 of FIG. 1 connected to the multiple axis continually variable transmission. This data will be used to determine what rpm the input speed will be given a particular desired horsepower output. The second data set will be of the axle output rpm and corresponding vehicle speed. The third data set will be adjustable be used to determine how much additional power to give to accelerate the vehicle to a desired speed over the power to maintain the speed or decelerate and how much engine braking to provide.

The programmable computer CPU 230 using the engine speed mapping information from the performance mode subroutine database and the computed increase or decrease for the desired speed input from the control box 200 previously recorded the programmable computer CPU 230 calculates the amount of additional power to move the vehicle to the desired speed. The computed additional power unfiltered result is internally checked against the CPU computed additional power result filter 440 which has preprogrammed calculated result ranges to verify that the current computed additional power unfiltered result is within the predetermined limits. If the current computed additional power unfiltered result falls outside the limits then no change will be made until new input is received and a result is computed that is within the limits. Once a computed additional power result filtered 450 is validated by the programmable computer CPU 230 it is transmitted to the control box 200 for the next step in the process of one embodiment.

While the filtering of the data flow and checking for valid data may seem cumbersome and slow, it is all happening instantaneously because modern computer technology provides faster processing. Since the controlled applied resistance multiple axis continually variable transmission system 100 is controlling hundreds of horsepower of force, tens of thousands of dollars of investment and the safety of the driver and occupants not to heed the old computer industry adage of "garbage in, garbage out" would at the least be reckless. The controlled applied resistance multiple axis continually variable transmission system 100 provides the checks and balances in the programming portion of the control systems which assures reliable efficient operations of one embodiment.

Figure 5:
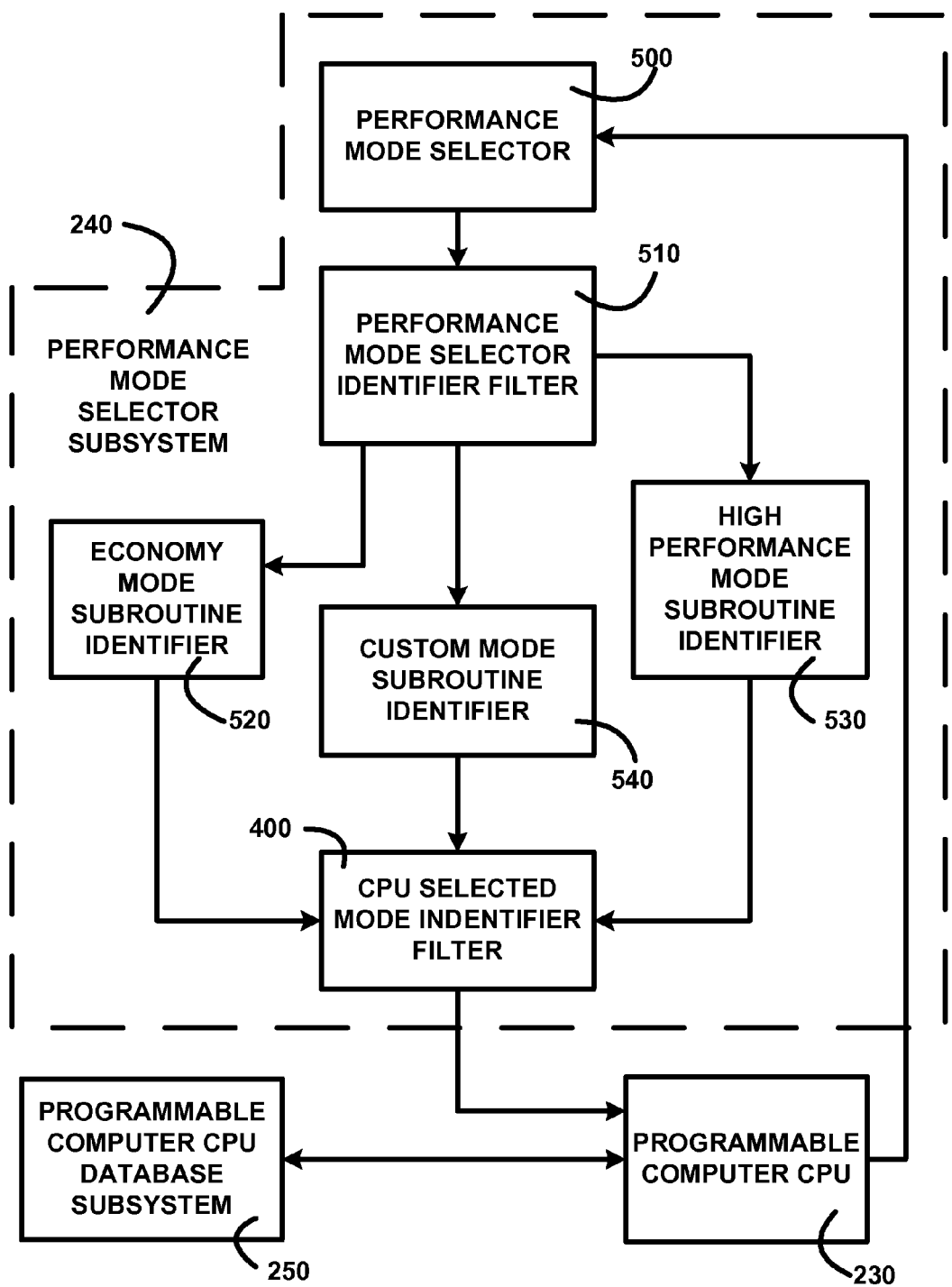
FIG. 5 shows a flow chart of a performance mode selector of one embodiment.

Performance Mode Selector Subsystem:

FIG. 5 shows a flow chart of the performance mode selector of one embodiment. FIG. 5 is a detailed illustration of multiple axis continually variable transmission mode selection subsystem that is referenced in FIG. 4. A performance mode selection is made using the performance mode selector subsystem 240 by operating the performance mode selector 500. The driver sets the desired performance mode using the performance mode selector subsystem 240. The performance mode selector subsystem 240 is programmable. The number of performance modes can be varied and each individual performance mode is assigned a digital identifier code. The number of performance modes available for example can include the economy mode subroutine 410 of FIG. 4, the custom mode subroutine 430 of FIG. 4 and the high performance mode subroutine 420 of FIG. 4 of one embodiment.

Each performance mode will have an identifier code that will be checked by the performance mode selector identifier filter 510 for current active status. The economy mode subroutine 410 of FIG. 4 will be assigned the economy mode subroutine identifier 520 which will be transmitted to the CPU selected mode identifier filter 400 which will validate the economy mode subroutine 410 of FIG. 4 prior to input into the programmable computer CPU 230. The custom mode subroutine 430 of FIG. 4 will be assigned the custom mode subroutine identifier 540 which will be transmitted to the CPU selected mode identifier filter 400 which will validate the custom mode subroutine 430 of FIG. 4 prior to input into the programmable computer CPU 230 of one embodiment.

The high performance mode subroutine 420 of FIG. 4 will be assigned the high performance mode subroutine identifier 530 which will be transmitted to the CPU selected mode identifier filter 400 which will validate the high performance mode subroutine 420 prior to input into the programmable computer CPU 230. Once a performance mode has been selected the assigned identifier code is logged into the programmable computer CPU 230 until a different performance mode is selected. When the performance mode identifier code input is received by the programmable computer CPU 230 it is checked against the CPU selected mode identifier filter 400 to confirm that a valid performance mode database subroutine exists. If no valid performance mode database subroutine exists the programmable computer CPU 230 will indicate an invalid performance mode selection has been made and a new performance mode should be selected of one embodiment.

The CPU selected mode identifier filter 400 additionally provides the input and output routing for database queries and reprogramming of performance mode subroutine database information. Using the selected mode identifier the programmable computer CPU 230 accesses the programmable computer CPU database subsystem 250 to compute the horsepower to move the vehicle to the desired speed for use further in the system of one embodiment.

Figure 6A:
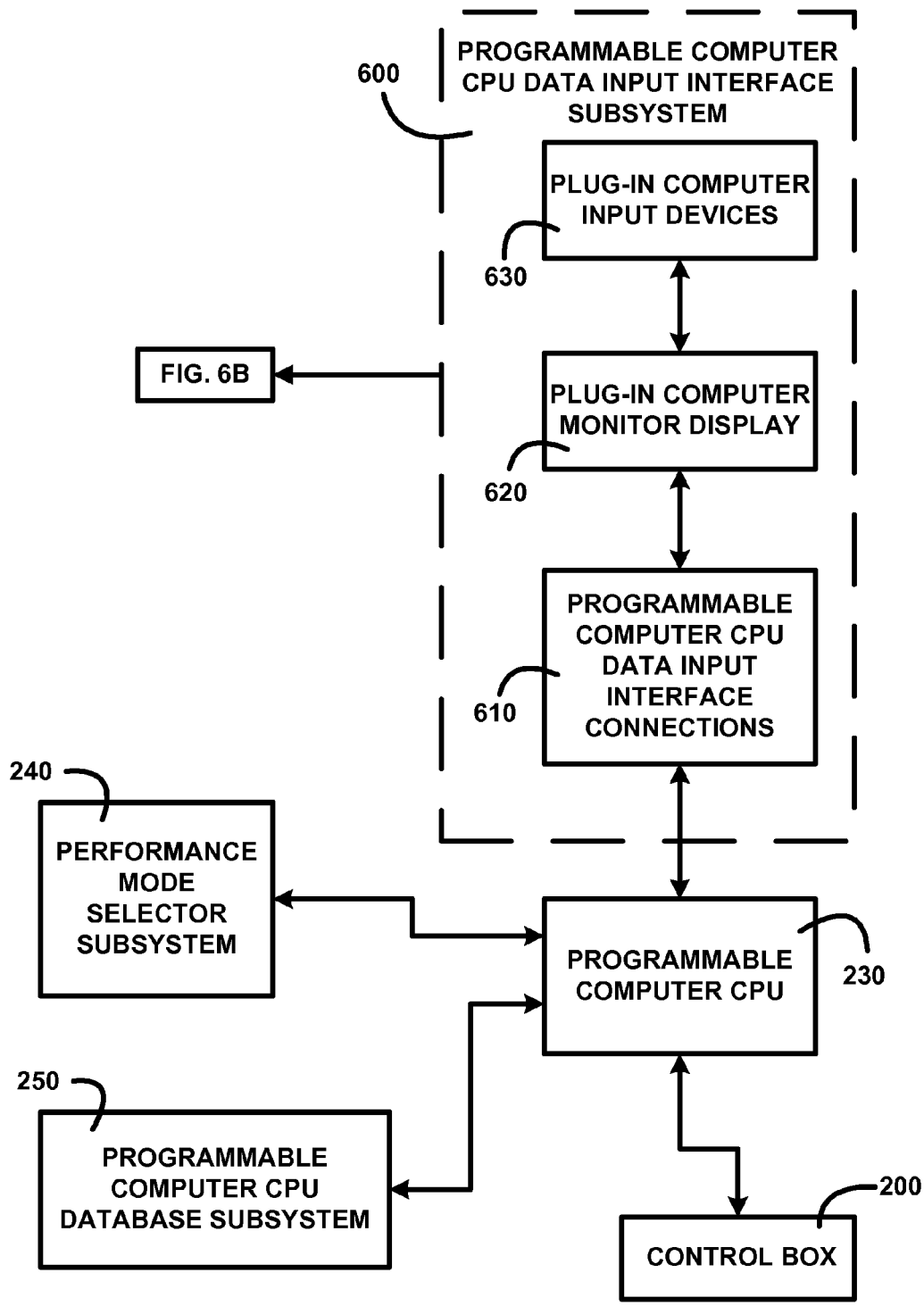
FIG. 6A shows a flow chart of a programmable computer CPU data input interface subsystem of one embodiment.

Data Input Interface Subsystem:

FIG. 6A shows a flow chart of the programmable computer CPU data input interface subsystem of one embodiment. FIG. 6A is a detailed illustration of a programmable computer CPU data input interface subsystem 600 for data input. The programmable computer CPU data input interface subsystem 600 shows the connections to access the programmable control system 110 of FIG. 1 to enter and edit for example performance matrix database information for updating the variations in operation that are controlled by the matrix data. The connections can be configured to use various accessories for example a plug-in computer monitor display 620, a plug-In computer input devices 630, a keyboard, a mouse and an external digital storage media device. Changes in the programming, data and other digital information in the programmable computer CPU 230, performance mode selector subsystem 240, programmable computer CPU database subsystem 250 and control box 200 of one embodiment.

Information uploading can be made through the connections from an external digital storage media device such as a portable memory stick or an external hard drive. Data output from the programmable computer CPU is communicated to the plug-in computer monitor display and can be created or edited with a plug-in computer keyboard input. The data changes once stored in the programmable computer CPU 230 are available for immediate use for example in the programmable computer CPU database subsystem 250 for calculations of adjustments that are transmitted to the control box 200 of one embodiment. Description of additional programmable computer functionality is shown in FIG. 6B.

Figure 6B:
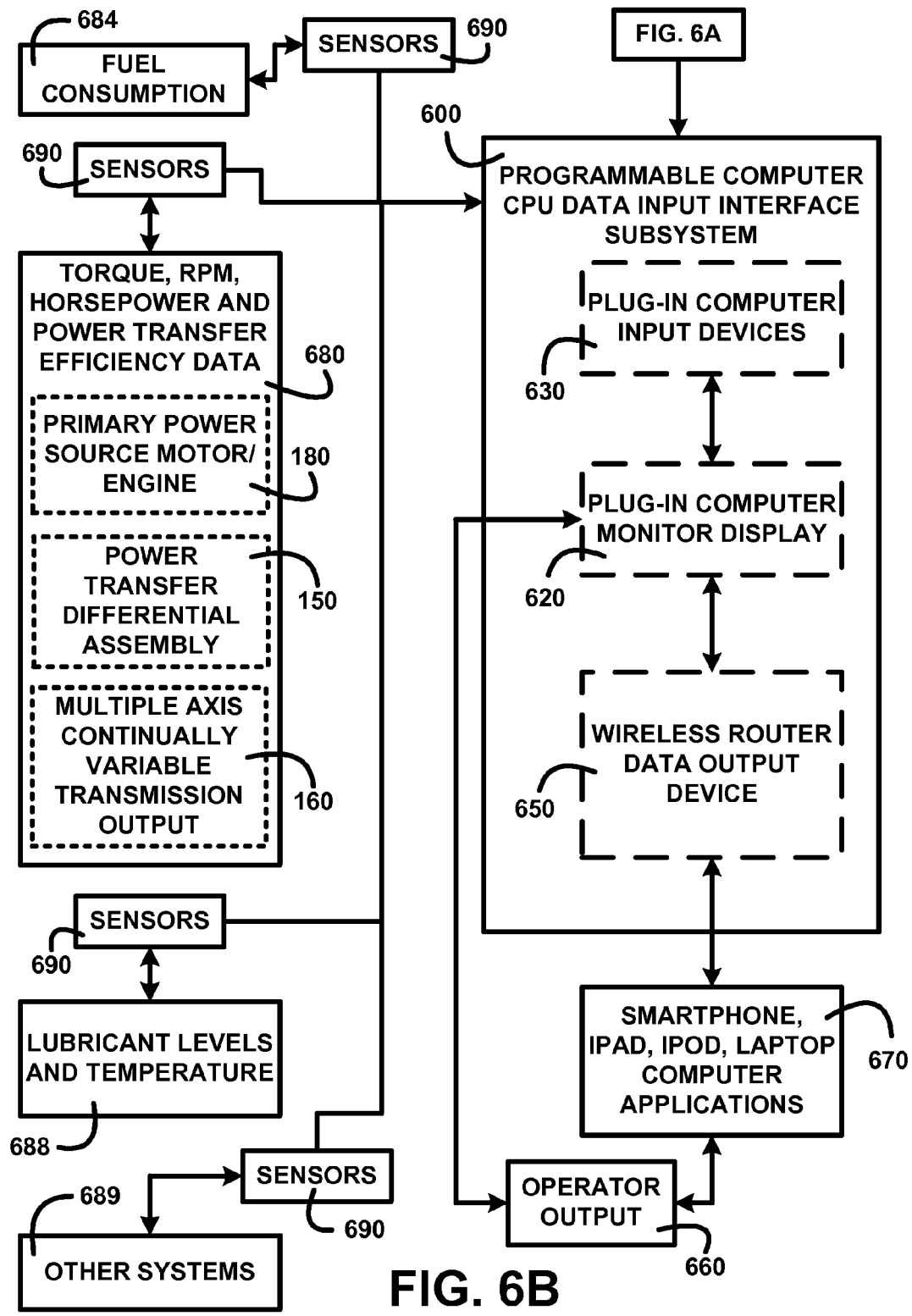
FIG. 6B shows a flow chart of a programmable computer CPU data output interface subsystem of one embodiment.

Data Output Interface Subsystem:

FIG. 6B shows a flow chart of a programmable computer CPU data output interface subsystem of one embodiment. FIG. 6B shows continuing from FIG. 6A additional functions of the programmable computer CPU data input interface subsystem 600. One or more sensors 690 are used to measure fuel consumption 684, lubricant levels and temperatures 688, torque, rpm, horsepower and power transfer efficiency data 680 and other systems 689 performance data. The systems data measured by the sensors 690 includes for example primary power source motor/engine 180, power transfer differential assembly 150 and multiple axis continually variable transmission output 160.

The sensors 690 measured data is transmitted to the programmable computer CPU data input interface subsystem 600 and recorded. The programmable computer CPU data input interface subsystem 600 includes programs to analyze the data and create operator output 660. Operator output 660 is used to display the raw performance data and analysis results to an operator via operator output 660 devices. Operator output 660 devices include plug-in computer input devices 630, a plug-in computer monitor display 620 and a wireless router data output device 650.

The wireless router data output device 650 enables the operator to access the data and analysed data using for example smartphone, Ipad, Ipod, laptop computer applications 670. The smartphone, Ipad, Ipod, laptop computer applications 670 include programmable operator output 660 configurations wherein the operator can customize the formatting and range of data accessed including setting alerts based on performance levels of one embodiment.

Figure 7A:
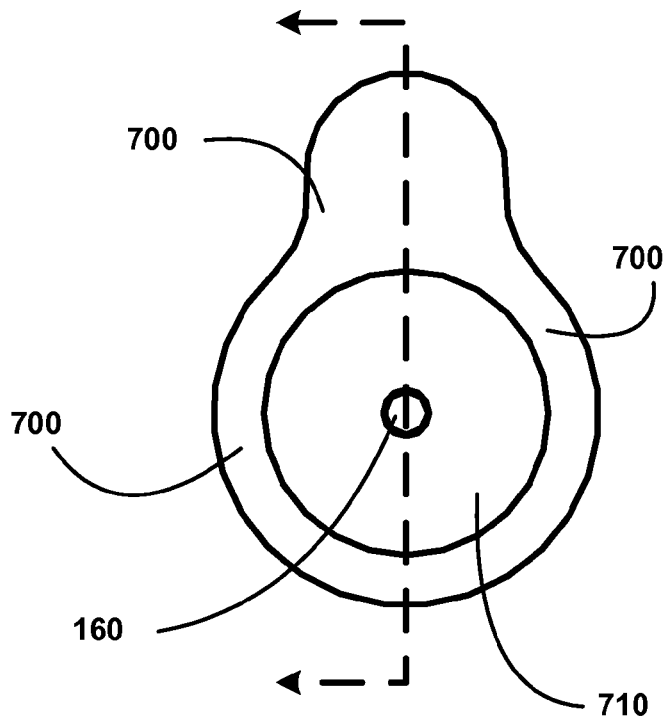
FIG. 7A shows for illustrative purposes only an example of a multiple axis continually variable transmission assembly in a drive train end view and section cut of one embodiment.
Figure 7B:
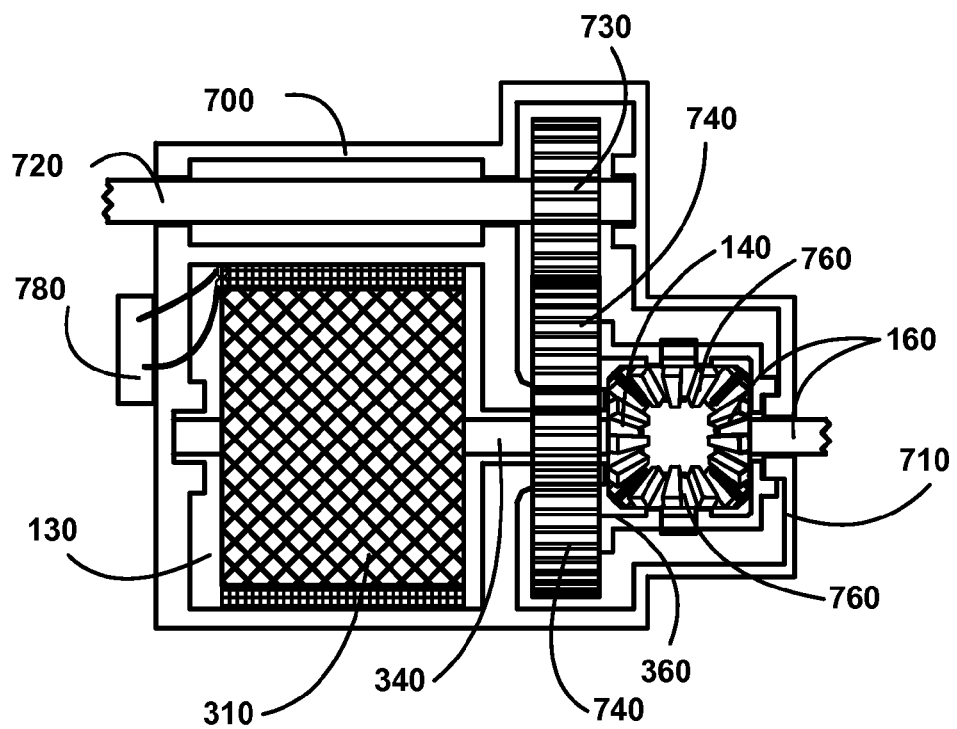
FIG. 7B shows for illustrative purposes only an example of a multiple axis continually variable transmission assembly in a side section view of one embodiment.

Resistance Assembly Electromagnetic Method Example:

FIG. 7A for illustrative purposes only shows the section cut point of reference from the output end for an internal side view of an example of the multiple axis continually variable transmission assembly of one embodiment. The internal side view of an example of the multiple axis continually variable transmission assembly 120 of FIG. 1 created by the section cut in FIG. 7A is illustrated in FIG. 7B. FIG. 7A shows an example of the multiple axis continually variable transmission assembly 120 of FIG. 1 from the side with a view of a multiple axis continually variable transmission assembly housing 700, a power transfer differential assembly housing 710 and the multiple axis continually variable transmission output 160 shaft of one embodiment.

FIG. 7B for illustrative purposes only shows a section internal side view of an example of the multiple axis continually variable transmission assembly 120 of FIG. 1 of one embodiment. FIG. 7B is a detailed illustration of a section of the interior of the multiple axis continually variable transmission assembly 120 of FIG. 1 interior from the viewing prospective of the section line as indicated in FIG. 7A. The detailed illustration in FIG. 7B shows an example of the multiple axis continually variable transmission assembly 120 of FIG. 1 with an electromagnetic 310 method of the gate differential resistance assembly 130 resistance assembly. Shown in FIG. 7B is the multiple axis continually variable transmission assembly housing 700. The power input shaft 720 is rotated by the primary power source motor/engine 180 of FIG. 1 and in turn rotates a power input gear #1 730. The power input gear #1 730 meshes with power input transfer gear #2 740 and rotates the differential gear case 360 which is attached to power input transfer gear #2 740. This causes the two gears 760 of the power transfer differential assembly 150 of FIG. 1 to rotate of one embodiment.

The gate differential resistance assembly 130 with the electromagnetic 310 resistance method that is energized with the electrical connection 780. The amount of resistance is controlled through the multiple axis continually variable transmission control box 200 of FIG. 2. This resistance is transferred by the resistance transfer shaft 340 to the gate differential resistance output 140 which in turn varies the multiple axis continually variable transmission output 160. The power transferred to the multiple axis continually variable transmission output 160 is the difference between the power from the power input shaft 720 and the resistance produced by the gate differential resistance assembly 130 of one embodiment.

Figure 7C:
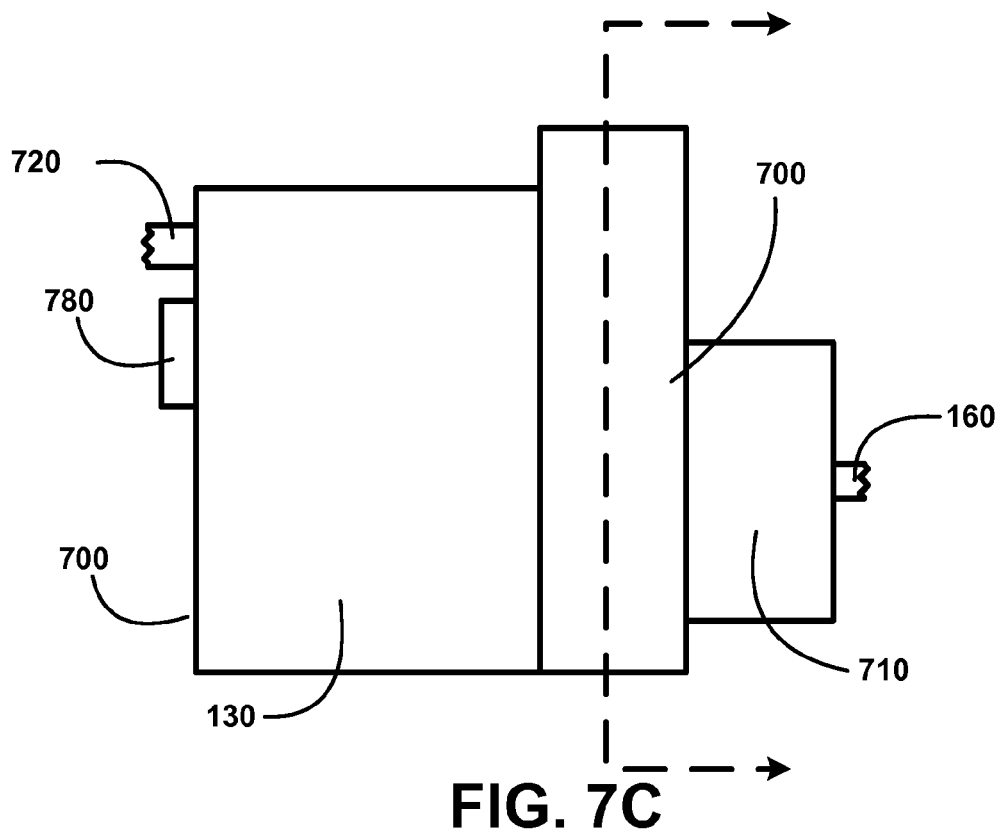
FIG. 7C shows for illustrative purposes only an example of a multiple axis continually variable transmission assembly in a side view and section cut of one embodiment.
Figure 7D:
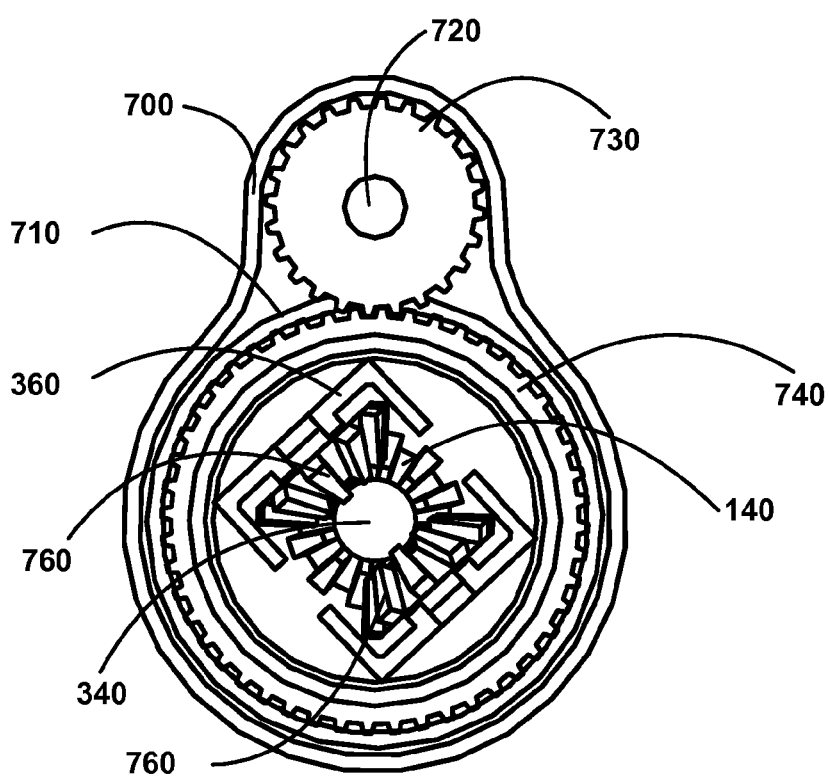
FIG. 7D shows for illustrative purposes only an example of a multiple axis continually variable transmission assembly in a drive train end section view of one embodiment.

FIG. 7C for illustrative purposes only shows the section cut point of reference from a side view for an internal end view of an example of the multiple axis continually variable transmission assembly of one embodiment. The internal end view of an example of the multiple axes continually variable transmission assembly 120 of FIG. 1 created by the FIG. 7C section cut is illustrated in FIG. 7D. The illustration in FIG. 7C shows the multiple axis continually variable transmission assembly 120 of FIG. 1 and multiple axis continually variable transmission assembly housing 700 from the side. Power transmitted from the primary power source motor/engine 180 of FIG. 1 enters by rotation of the power input shaft 720. On the input end of the exterior of the multiple axes continually variable transmission assembly housing 700 is the electrical connection 780 to the electromagnetic 310 of FIG. 3 resistance method used in this example of the gate differential resistance assembly 130. The gate differential resistance assembly 130 controls the rotation of the multiple axis continually variable transmission output 160 extending from the power transfer differential multiple axis continually variable transmission assembly housing 710 of one embodiment.

FIG. 7D for illustrative purposes only shows a section internal end view of an example of the multiple axis continually variable transmission assembly of one embodiment. FIG. 7D is a detailed illustration of a section of the interior of the multiple axes continually variable transmission assembly 120 of FIG. 1 interior from the output end as indicated in FIG. 7C. The illustration in FIG. 7D shows the multiple axis continually variable transmission assembly housing 700 output end view of some of the gears. The power input shaft 720 rotating with power from the primary power source motor/engine 180 of FIG. 1 rotates the power input gear #1 730 which meshes with the power input transfer gear #2 740 and rotates the differential gear case 360 which is attached to power input transfer gear #2 740. The differential gear case 360 imparts rotation to the two gears 760 of the power transfer differential assembly 150 of FIG. 1 inside the differential gear case 360. The resistance transfer shaft 340 transfers the electromagnetic 310 resistance adjusted rotation to gate differential resistance output 140 which in turn varies the multiple axis continually variable transmission output 160 of FIG. 1 of one embodiment.

Figure 8A:
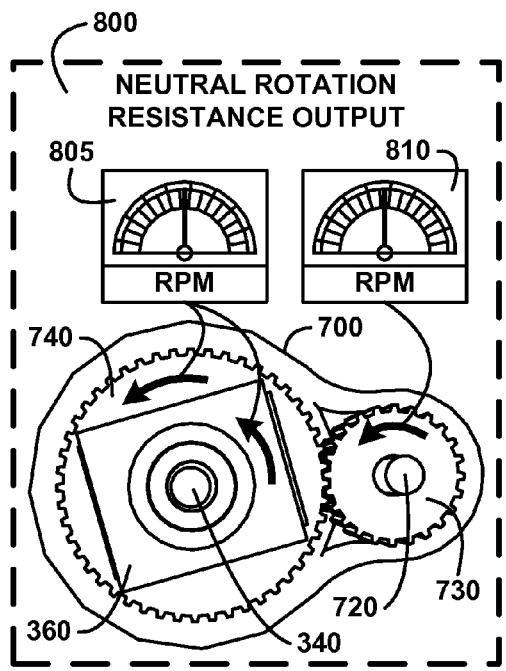
FIG. 8A shows for illustrative purposes only an example of a multiple axis continually variable transmission neutral rotation resistance output of one embodiment.

Neutral Rotation Resistance Output:

FIG. 8A shows for illustrative purposes only an example of a multiple axis continually variable transmission neutral rotation resistance output of one embodiment. The programmable control system 110 of FIG. 1 receives a neutral desired speed or power level from operator input 170 of FIG. 1. The neutral power level is processed and converted into a neutral rotation resistance output 800. The neutral rotation resistance output 800 is applied to the power input gear #1 730 rotating on the power input shaft 720 at a power input gear #1 rpm 810. The neutral rotation resistance output 800 is applied to the power input transfer gear #2 740 of one embodiment.

The power input transfer gear #2 740 rotates on the resistance transfer shaft 340. The power input transfer gear #2 740 rotating at the same rpm as the power input gear #1 rpm 810 in the same direction produces a matching resistance transfer shaft neutral matching direction rpm 805. The resistance transfer shaft neutral matching direction rpm 805 transfers the neutral speed and power level to the transmission through the power transfer differential assembly 150 of FIG. 1 installed in the differential gear case 360. The neutral rotation resistance output 800 maintains the speed and power levels constant with the speed and power levels of the primary power source motor/engine 180 of FIG. 1 of one embodiment.

Figure 8B:
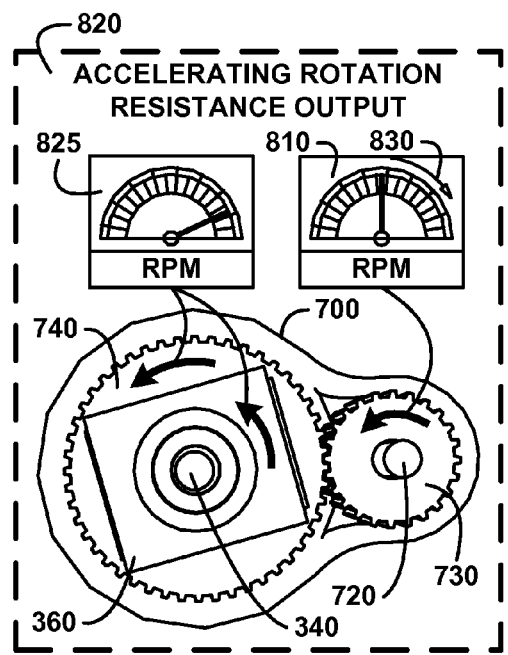
FIG. 8B shows for illustrative purposes only an example of a multiple axis continually variable transmission accelerating rotation resistance output of one embodiment.

Accelerating Rotation Resistance Output:

FIG. 8B shows for illustrative purposes only an example of a multiple axis continually variable transmission accelerating rotation resistance output of one embodiment. The programmable control system 110 of FIG. 1 receives a desired accelerated speed or power level from operator input 170 of FIG. 1. The accelerated power level is processed and converted into an accelerating rotation resistance output 820. The accelerating rotation resistance output 820 is applied to the power input gear #1 730 rotating on the power input shaft 720 at a power input gear #1 rpm 810. The accelerating rotation resistance output 820 is applied to the power input transfer gear #2 740 of one embodiment.

The power input transfer gear #2 740 rotates on the resistance transfer shaft 340. The power input transfer gear #2 740 rotating at an accelerated or faster rpm then the power input gear #1 rpm 810 and in the same direction produces a resistance transfer shaft acceleration matching direction rpm 825. The resistance transfer shaft acceleration matching direction rpm 825 transfers the accelerated speed and power level to the transmission through the power transfer differential assembly 150 of FIG. 1 installed in the differential gear case 360. The accelerating rotation resistance output 820 maintains the accelerated speed and power levels in the transmission until the power input gear #1 accelerating rpm 830 of the primary power source motor/engine 180 of FIG. 1 matches the resistance transfer shaft acceleration matching direction rpm 825 of one embodiment.

Figure 8C:
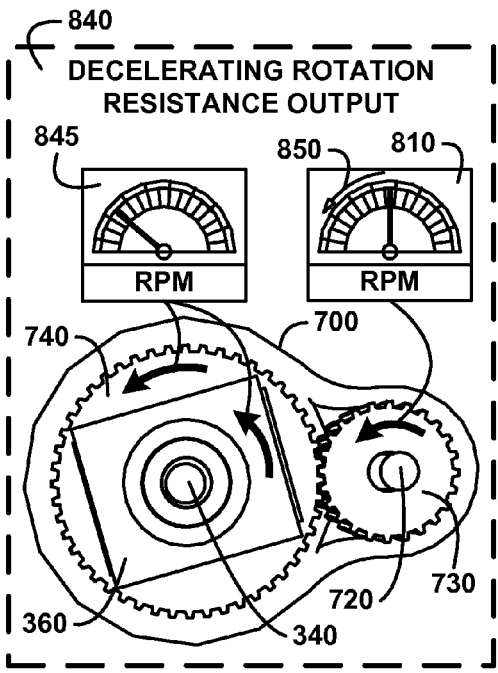
FIG. 8C shows for illustrative purposes only an example of a multiple axis continually variable transmission decelerating rotation resistance output of one embodiment.

Decelerating Rotation Resistance Output:

FIG. 8C shows for illustrative purposes only an example of a multiple axis continually variable transmission decelerating rotation resistance output of one embodiment. The programmable control system 110 of FIG. 1 receives a desired decelerated speed or power level from operator input 170 of FIG. 1. The decelerated power level is processed and converted into a decelerating rotation resistance output 840. The decelerating rotation resistance output 840 is applied to the power input gear #1 730 rotating on the power input shaft 720 at a power input gear #1 rpm 810. The decelerating rotation resistance output 840 is applied to the power input transfer gear #2 740 of one embodiment.

The power input transfer gear #2 740 rotates on the resistance transfer shaft 340. The power input transfer gear #2 740 rotating at a decelerated or slower rpm then the power input gear #1 rpm 810 in the same direction produces a resistance transfer shaft deceleration matching direction rpm 845. The resistance transfer shaft deceleration matching direction rpm 845 transfers the decelerated speed and power level to the transmission through the power transfer differential assembly 150 of FIG. 1 installed in the differential gear case 360. The decelerating rotation resistance output 840 maintains the decelerated speed and power levels in the transmission until the power input gear #1 decelerating rpm 850 of the primary power source motor/engine 180 of FIG. 1 matches the resistance transfer shaft deceleration matching direction rpm 845 of one embodiment.

Figure 8D:
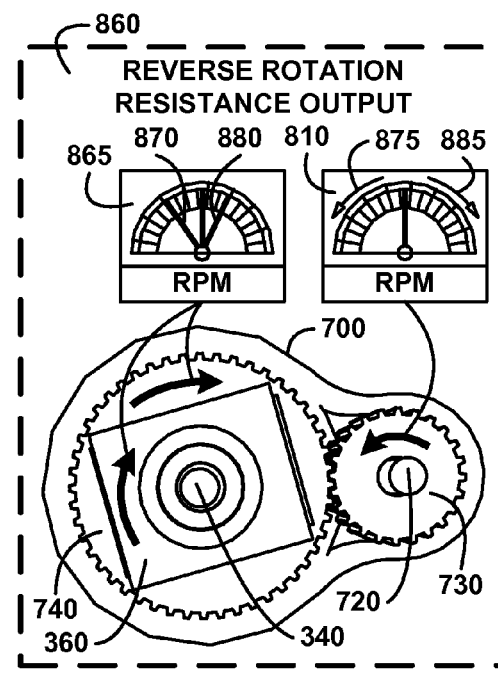
FIG. 8D shows for illustrative purposes only an example of a multiple axis continually variable transmission reverse rotation resistance output of one embodiment.

Reverse Rotation Resistance Output:

FIG. 8D shows for illustrative purposes only an example of a multiple axis continually variable transmission reverse rotation resistance output of one embodiment. The programmable control system 110 of FIG. 1 receives a desired reverse same, slower decelerated or faster accelerated speed or power level from operator input 170 of FIG. 1. The reverse same, slower decelerated or faster accelerated power level is processed and converted into a reverse rotation resistance output 860. The reverse rotation resistance output 860 is applied to the power input gear #1 730 rotating on the power input shaft 720 at a power input gear #1 rpm 810. The reverse rotation resistance output 860 is applied to the power input transfer gear #2 740. The power input transfer gear #2 740 rotates on the resistance transfer shaft 340. The reverse rotation resistance output 860 can be applied to create a same speed, slower decelerated or faster accelerated reverse direction of for example an automobile of one embodiment.

At a same speed or power level the reverse rotation resistance output 860 produces a resistance transfer shaft reverse direction rpm 865. The resistance transfer shaft reverse direction rpm 865 operates at the same speed or power level but in the reverse direction as the power input gear #1 730 direction of rotation. The resistance transfer shaft reverse direction rpm 865 at the same speed or power level transfers the reverse rotation resistance output 860 to the transmission through the power transfer differential assembly 150 of FIG. 1 installed in the differential gear case 360. The reverse rotation resistance output 860 maintains the speed and power levels constant with the speed and power levels of the primary power source motor/engine 180 of FIG. 1 but in the reverse direction causing for example an automobile to move in reverse of one embodiment.

At a slower decelerated speed or power level the reverse rotation resistance output 860 produces a resistance transfer shaft reverse direction rpm 865. The resistance transfer shaft reverse direction rpm 865 creates a resistance transfer shaft reverse deceleration rpm 870. The resistance transfer shaft reverse deceleration rpm 870 maintains the reverse slower decelerated speed and power levels in the transmission until the power input gear #1 reverse decelerating rpm 875 of the primary power source motor/engine 180 of FIG. 1 matches the resistance transfer shaft reverse deceleration rpm 870 of one embodiment.

At a faster accelerated speed or power level the reverse rotation resistance output 860 produces a resistance transfer shaft reverse direction rpm 865. The resistance transfer shaft reverse direction rpm 865 creates a resistance transfer shaft reverse acceleration rpm 880. The resistance transfer shaft reverse acceleration rpm 880 maintains the reverse faster accelerated speed and power levels in the transmission until the power input gear #1 reverse accelerating rpm 885 of the primary power source motor/engine 180 of FIG. 1 matches the resistance transfer shaft reverse acceleration rpm 880 of one embodiment.

Power Regeneration Flywheel System Application:

The controlled applied resistance multiple axis continually variable transmission system 100 can include the integration of a subsystem that captures energy from braking, either in kinetic form or electrical, and efficiently reuses it for acceleration. The controlled applied resistance multiple axis continually variable transmission system 100 with a regenerative braking subsystem could double current fuel mileage. An extremely effective means to store kinetic energy is by holding it in a flywheel. The present invention operating at continuously variable speed provides an efficient means of storing energy into the flywheel and the subsequent extraction because the use of power in a motor vehicle is non-constant and routinely variable. Even though a vehicle may at times require 250 hp it regularly requires 20 hp or so and during deceleration the vehicle can give back energy of one embodiment.

Vehicle designs require a motor to provide a range of hp output for example from 0 to 250 hp to meet the potential demands. Average energy hp consumption of a typical trip is between 15 to 20 hp. An engine with a maximum hp output of 20 to 25 hp can deliver that amount of energy more efficiently than an engine designed to deliver a maximum output of 250+ hp. Engines designed to deliver less maximum hp and much narrower rpm ranges have much greater fuel efficiency. Different fuel and engine design types can also be used to achieve maximum efficiency. Gasoline internal combustion engines are far less efficient than diesel or turbine technology.

Large performance and efficiency increases can be realized by utilizing the present invention, flywheel storage devices and highly efficient motors which when used in combination would significantly increase vehicle mileage. Flywheels can be charged continuously, even when the vehicle is not moving and during braking. Vehicle braking converts energy into heat. The multiple axis continually variable transmission systems can recapture that braking energy and store it in a flywheel for later reuse of one embodiment.

Figure 9:
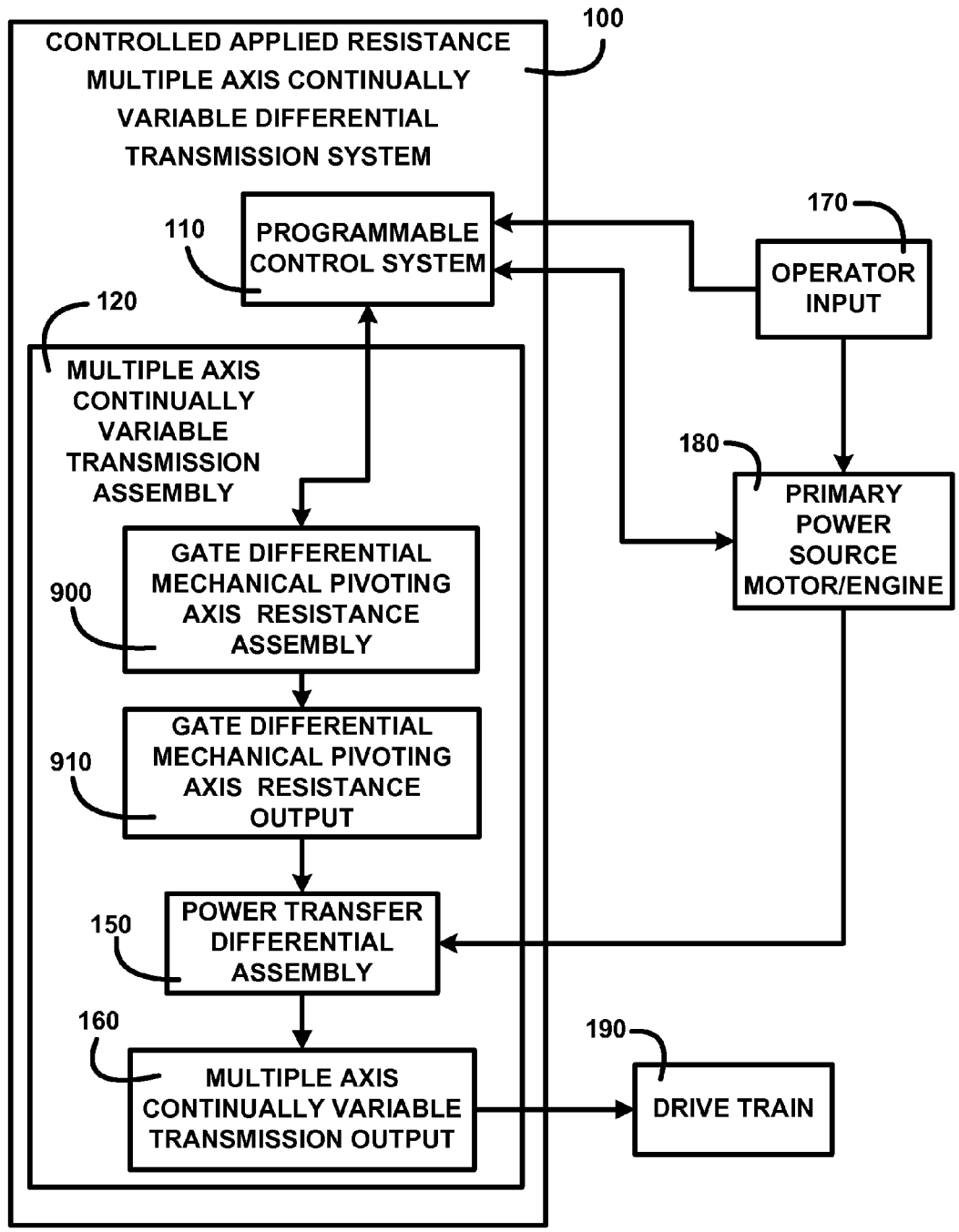
FIG. 9 shows a block diagram of an overview of a gate differential mechanical pivoting axis resistance assembly of one embodiment.

Mechanical Pivoting Axis Resistance Assembly:

FIG. 9 shows a block diagram of an overview of a gate differential mechanical pivoting axis resistance assembly of one embodiment. FIG. 9 shows the controlled applied resistance multiple axis continually variable transmission system 100 with a gate differential mechanical pivoting axis resistance assembly 900 of one embodiment. The controlled applied resistance multiple axis continually variable differential transmission system 100 includes the multiple axis continually variable transmission assembly 120 configured to rotate one axis X, Y, or Z and splits the motion to one or the other axis.

FIG. 9 shows an overview of the controlled applied resistance multiple axis continually variable transmission system 100 in an operational arrangement. The motor energy or power in the form of rotational power from the primary power source motor/engine 180 is conveyed to the multiple axis continually variable transmission assembly 120 which splits the speed and energy or power. The programmable control system 110 receives the desired speed or power level from operator input 170 then calculates the power level difference between actual motor speed and desired vehicle speed. The calculated result in the form of a ratio is transmitted to a gate differential mechanical pivoting axis resistance assembly 900 which uses the varying ratio to proportionately control the rotational speed of a gate differential mechanical pivoting axis resistance output 910. The gate differential mechanical pivoting axis resistance output 910 adjusts the operation of the power transfer differential assembly 150 and thereby the multiple axis continually variable transmission output 160. The gate or diverter consumes little energy. The multiple axis continually variable transmission assembly 120 transfers sufficient power through the gate differential mechanical pivoting axis resistance output 910 shaft to the multiple axis continually variable transmission output 160 to the drive train 190 regardless of rpm to reach the desired speed power level. The difference between the speed and the power coming into the power transfer differential assembly 150 and what is determined to produce the desired speed is adjusted by the controlled operation gate differential resistance assembly 130 through the interaction of the gate differential mechanical pivoting axis resistance output 910 and the power transfer differential assembly 150 of one embodiment.

The operation of the controlled applied resistance multiple axis continually variable transmission system 100 causes the engine to rev up to its optimum rpm, smoothly and constantly accelerating an auto, delivering its peak horsepower and not having to shift gears and run up again. The controlled applied resistance multiple axis continually variable transmission system 100 adjusts the engine to idle or reduce power to reduce fuel consumption while maintaining cruising speed. The operation of the programmable control system 110 controls the acceleration of the multiple axes continually variable transmission assembly 120 instantly reducing the time used to reach the desired speed using the drive train 190 while controlling the engine to optimally change operating performance levels to deliver the desired power of one embodiment.

Figure 10:
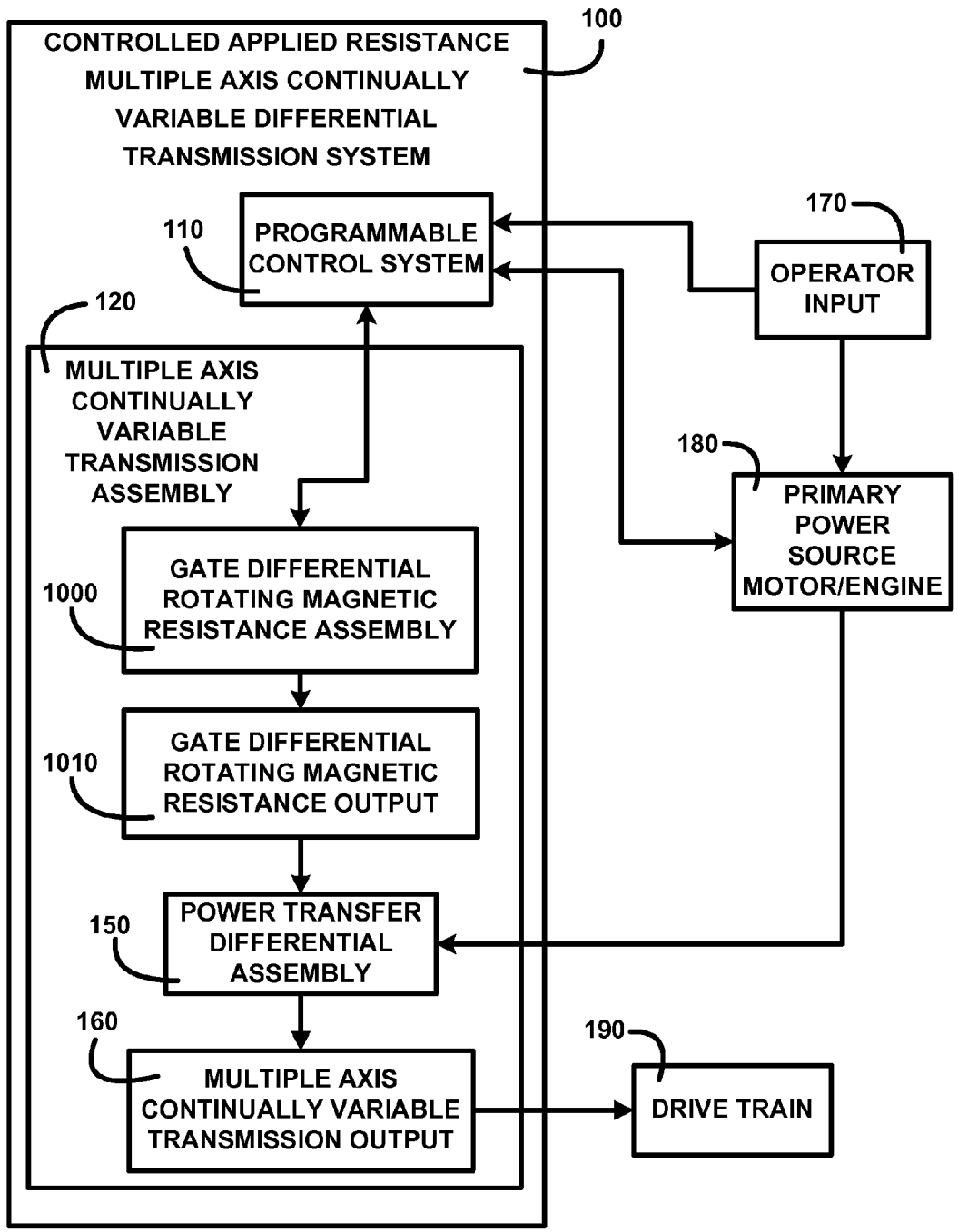
FIG. 10 shows a block diagram of an overview of a gate differential rotating magnetic resistance assembly of one embodiment.

Rotating Magnetic Resistance Assembly:

FIG. 10 shows a block diagram of an overview of a gate differential rotating magnetic resistance assembly of one embodiment. FIG. 10 shows the controlled applied resistance multiple axis continually variable transmission system 100 with a gate differential rotating magnetic resistance assembly 1000 of one embodiment. The controlled applied resistance multiple axis continually variable differential transmission system 100 includes the multiple axis continually variable transmission assembly 120 configured to rotate one axis X, Y, or Z and splits the motion to one or the other axis.

FIG. 10 shows an overview of the controlled applied resistance multiple axis continually variable transmission system 100 in an operational arrangement. The motor energy or power in the form of rotational power from the primary power source motor/engine 180 is conveyed to the multiple axis continually variable transmission assembly 120 which splits the speed and energy or power. The programmable control system 110 receives the desired speed or power level from operator input 170 then calculates the power level difference between actual motor speed and desired vehicle speed. The calculated result in the form of a ratio is transmitted to a gate differential rotating magnetic resistance assembly 1000 which uses the varying ratio to proportionately control the rotational speed of a gate differential rotating magnetic resistance output 1010. The gate differential rotating magnetic resistance output 1010 adjusts the operation of the power transfer differential assembly 150 and thereby the multiple axis continually variable transmission output 160. The gate or diverter consumes little energy. The multiple axis continually variable transmission assembly 120 transfers sufficient power through the gate differential rotating magnetic resistance output 1010 shaft to the multiple axis continually variable transmission output 160 to the drive train 190 regardless of rpm to reach the desired speed power level. The difference between the speed and the power coming into the power transfer differential assembly 150 and what is determined to produce the desired speed is adjusted by the controlled operation gate differential resistance assembly 130 through the interaction of the gate differential rotating magnetic resistance output 1010 and the power transfer differential assembly 150 of one embodiment.

The operation of the controlled applied resistance multiple axis continually variable transmission system 100 causes the engine to rev up to its optimum rpm, smoothly and constantly accelerating an auto, delivering its peak horsepower and not having to shift gears and run up again. The controlled applied resistance multiple axis continually variable transmission system 100 adjusts the engine to idle or reduce power to reduce fuel consumption while maintaining cruising speed. The operation of the programmable control system 110 controls the acceleration of the multiple axes continually variable transmission assembly 120 instantly reducing the time used to reach the desired speed using the drive train 190 while controlling the engine to optimally change operating performance levels to deliver the desired power of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method for controlling the output ratio of the speed of operation and distribution of power/energy from a primary power source, comprising:
   operating a multiple axis continually variable differential transmission configured to include a gate differential resistance assembly configured to use a resistance method including an electromagnetic, a mechanical pivoting axis, a hydraulic system and rotating magnetic resistance systems to create rotation in an output shaft and gearing to apply a resistive force to a power transfer differential assembly;
   applying continuously variable resistance using the multiple axis continually variable differential transmission to a primary power source input to adjust the rotational power level and speed output to match an operator adjustable performance speed setting; and;
   controlling the operation of the multiple axis continually variable differential transmission to match the operator predetermined performance speed setting using an operator input, and to modify operating parameters based on an operator input and adjusting continuously variable resistance operations.

2. The method of claim 1, wherein the multiple axis continually variable differential transmission is configured to include the power transfer differential assembly configured to transfer the gate differential resistance assembly resistive force to a primary power source motor/engine input differential gear wherein a rotational power transfer is adjusted and transferred to a multiple axis continually variable transmission output shaft connected to a drive train of a vehicle and other machines.

3. An apparatus, comprising:
   means for adjusting the level of speed and power from a primary power source output to a drive train of a vehicle and other machines using a multiple axis continually variable differential transmission;
   means for creating a resistive force to apply to a power transfer differential assembly to adjust the level of speed and power from a primary power source output and transfer the adjusted speed and power to the drive train of a vehicle and other machines; and
   means for creating a continuous interactive operator adjustable speed and power level control system to connect to the primary power source and the multiple axis continually variable differential transmission.

4. The apparatus of 3, further comprising means for creating a rotational resistance configured to form a gate differential resistance assembly configured to include an output shaft and a differential gear to transfer the rotational resistance to the power transfer differential assembly.

5. An apparatus, comprising:
   an input speed rpm to reach a predetermined horsepower output of a specific primary power source; includes a drive axle output rpm and corresponding vehicle speed; and an operator operating speed setting input to match an operator operating speed input for transmitting to a control box;
   a device to regulate an operation of a multiple axis continually variable differential transmission and the specific primary power source;
   a performance mode selector configured to enable an operator to select and adjust a performance mode to input the operating speed setting; and;
   at least one control system configured to include the control box configured to regulate operating systems including an accelerator/gas pedal, the specific primary power source and the multiple axis continually variable differential transmission.

6. The apparatus of claim 5, wherein the device to regulate the operation of the multiple axis continually variable differential transmission assembly and the specific primary power source is configured to include operating parameters for operations ranging between maximum fuel use economy and maximum performance operating levels.

\* \* \* \* \*